Patented May 11, 1937

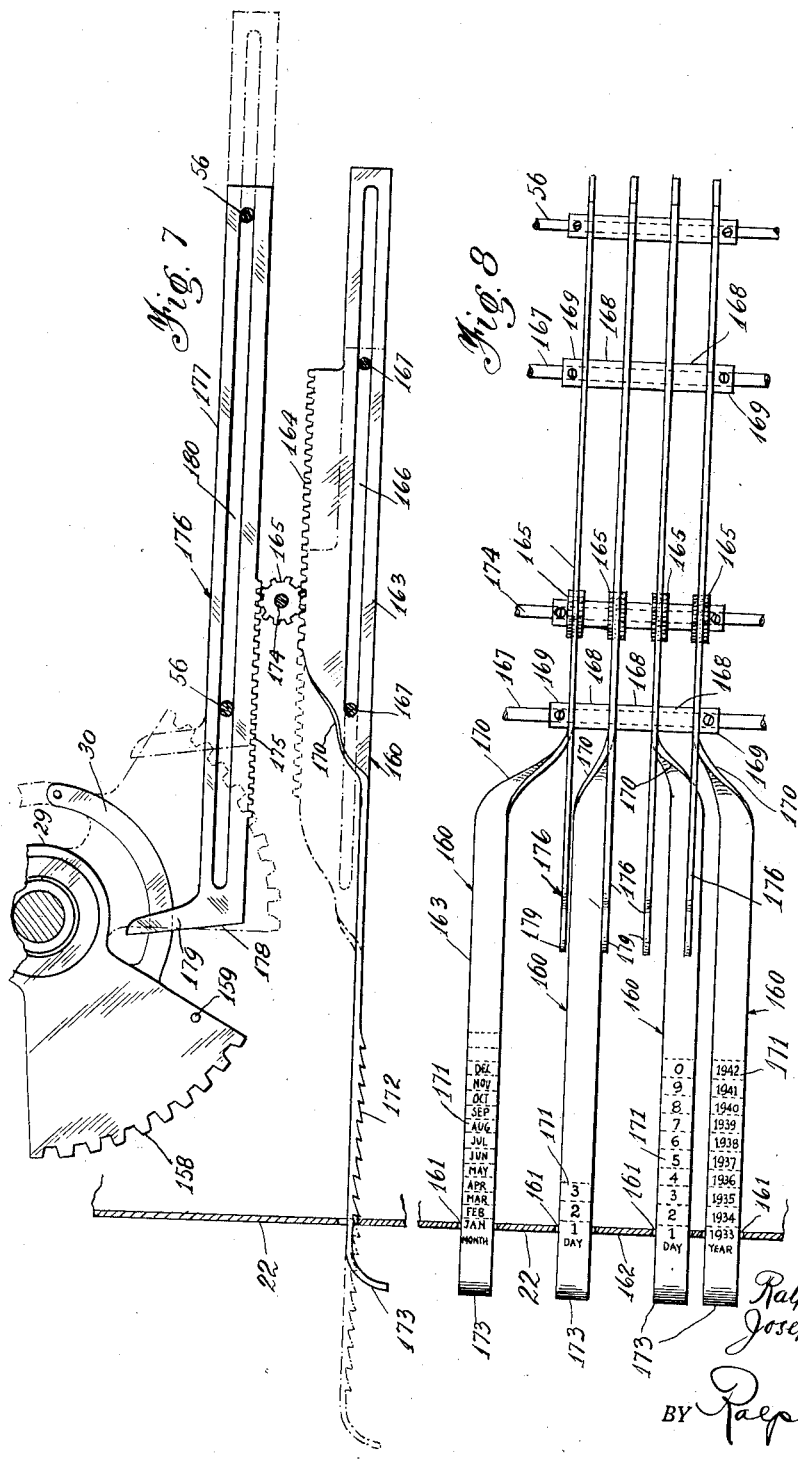

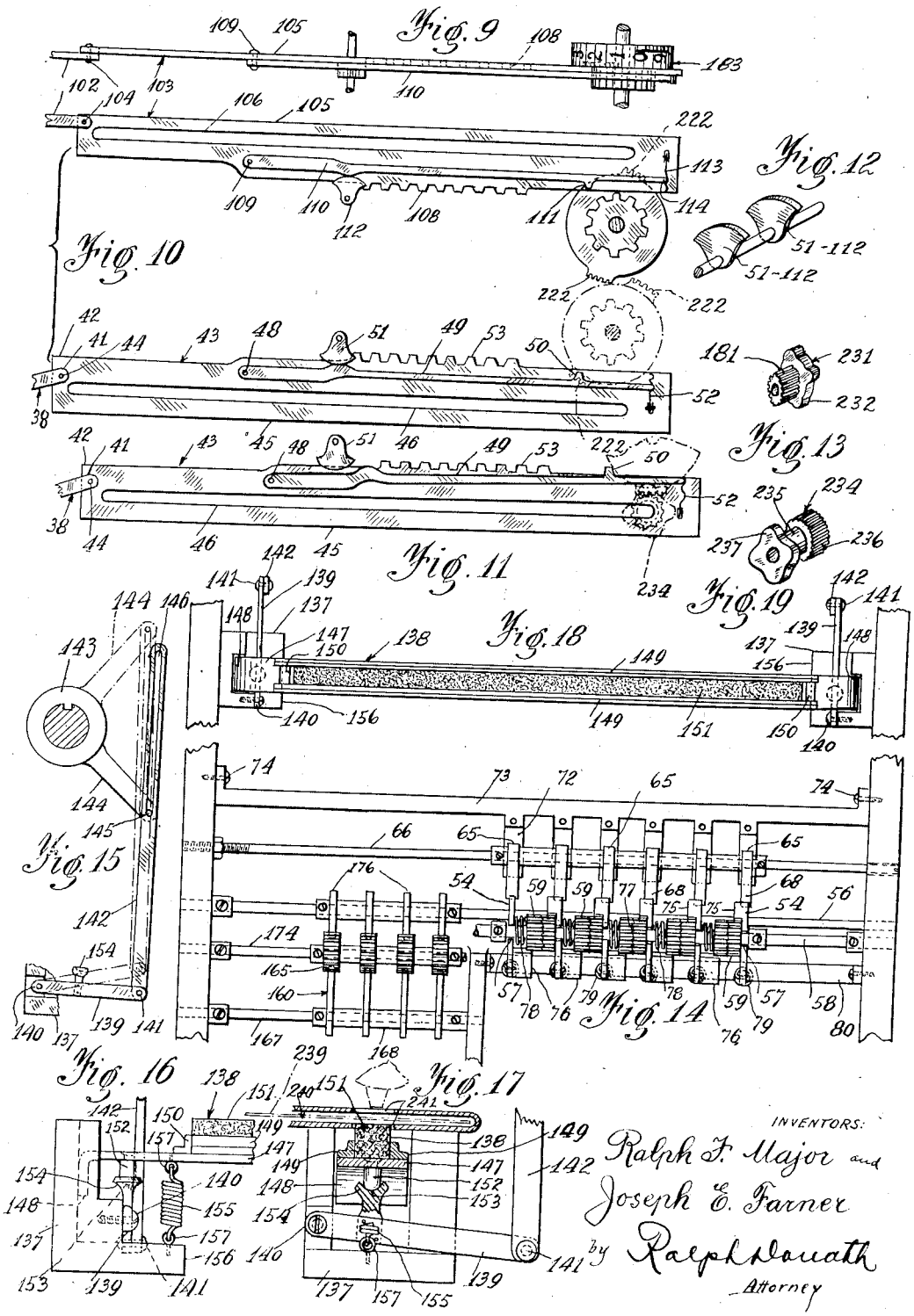

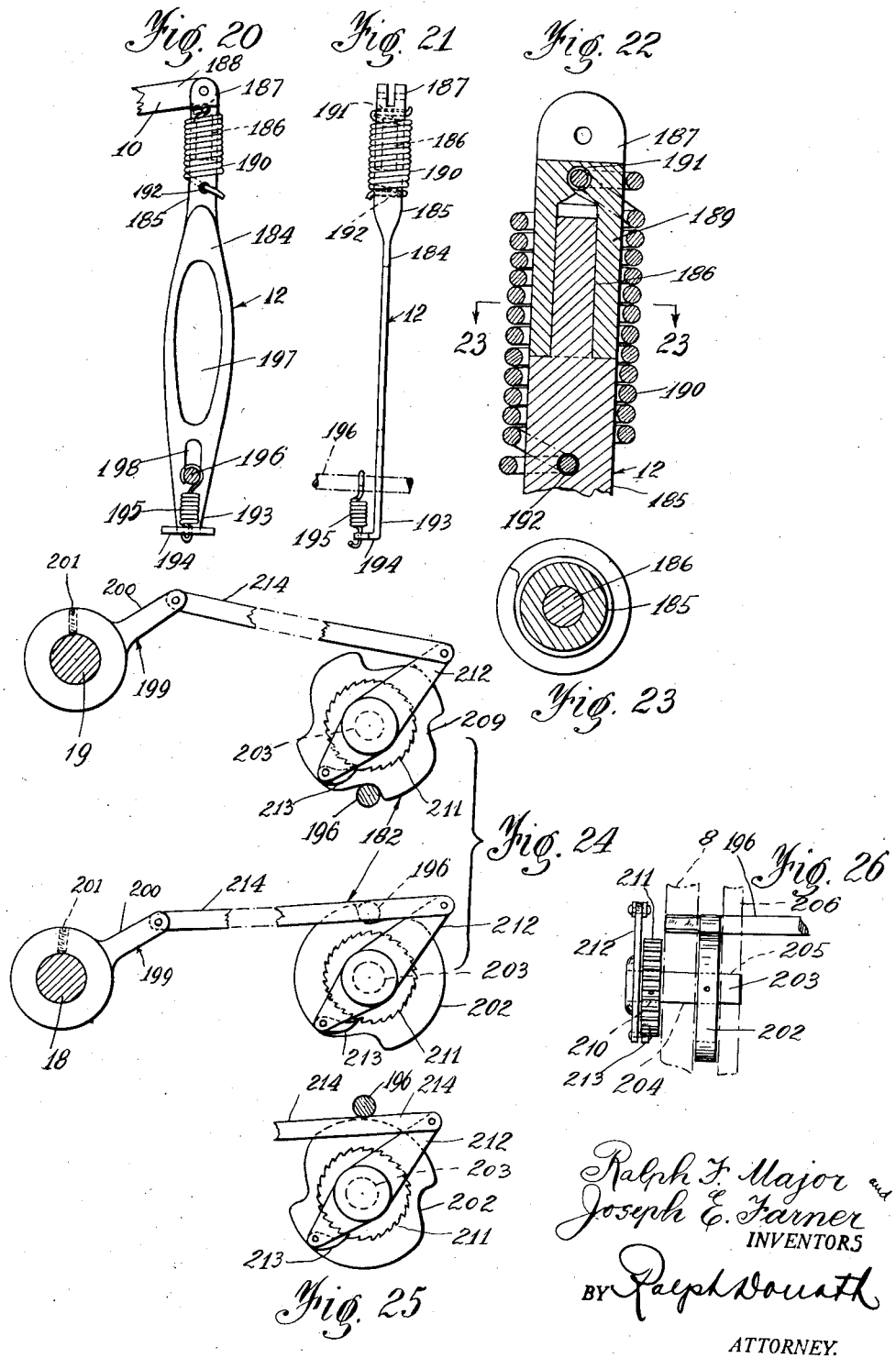

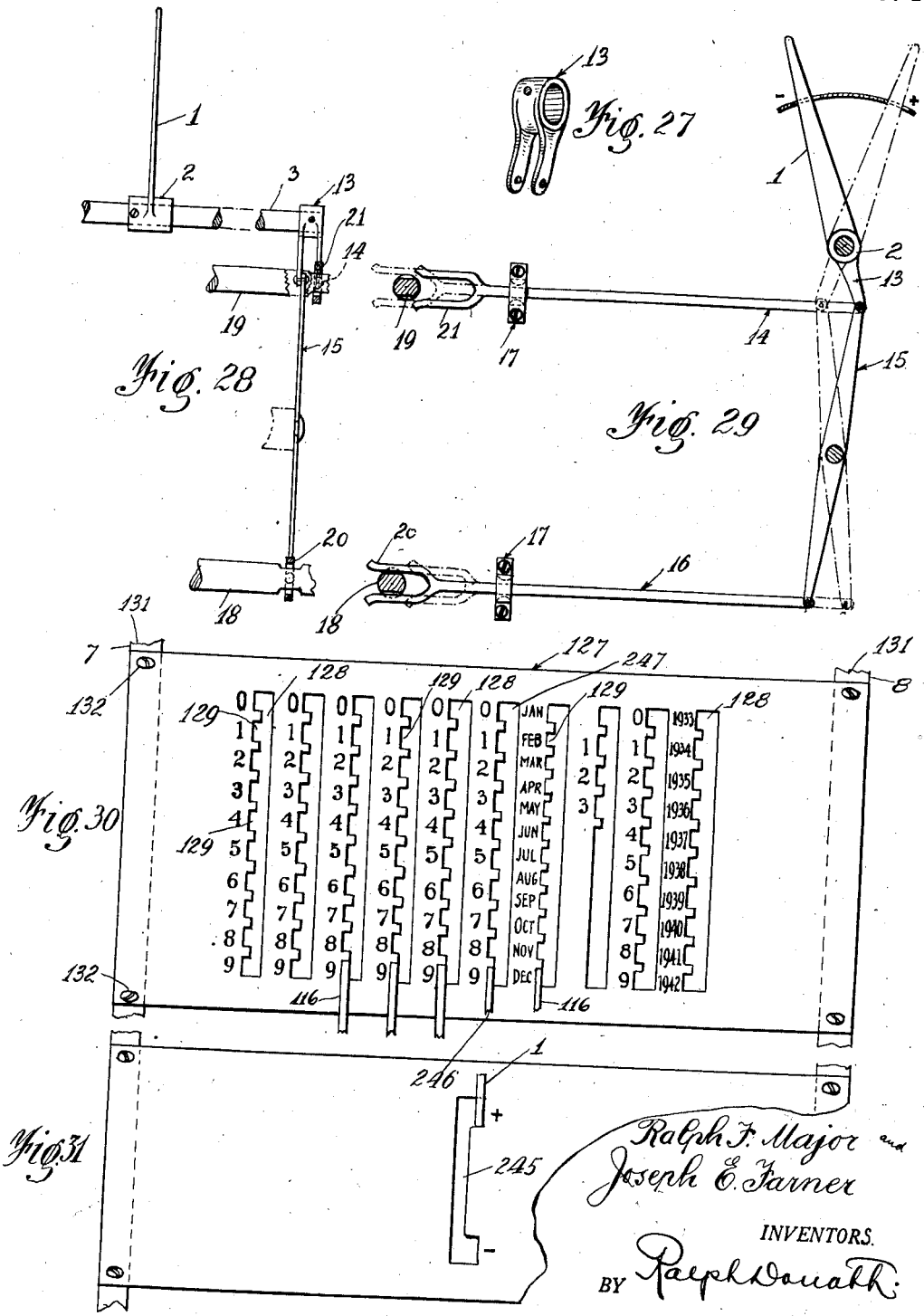

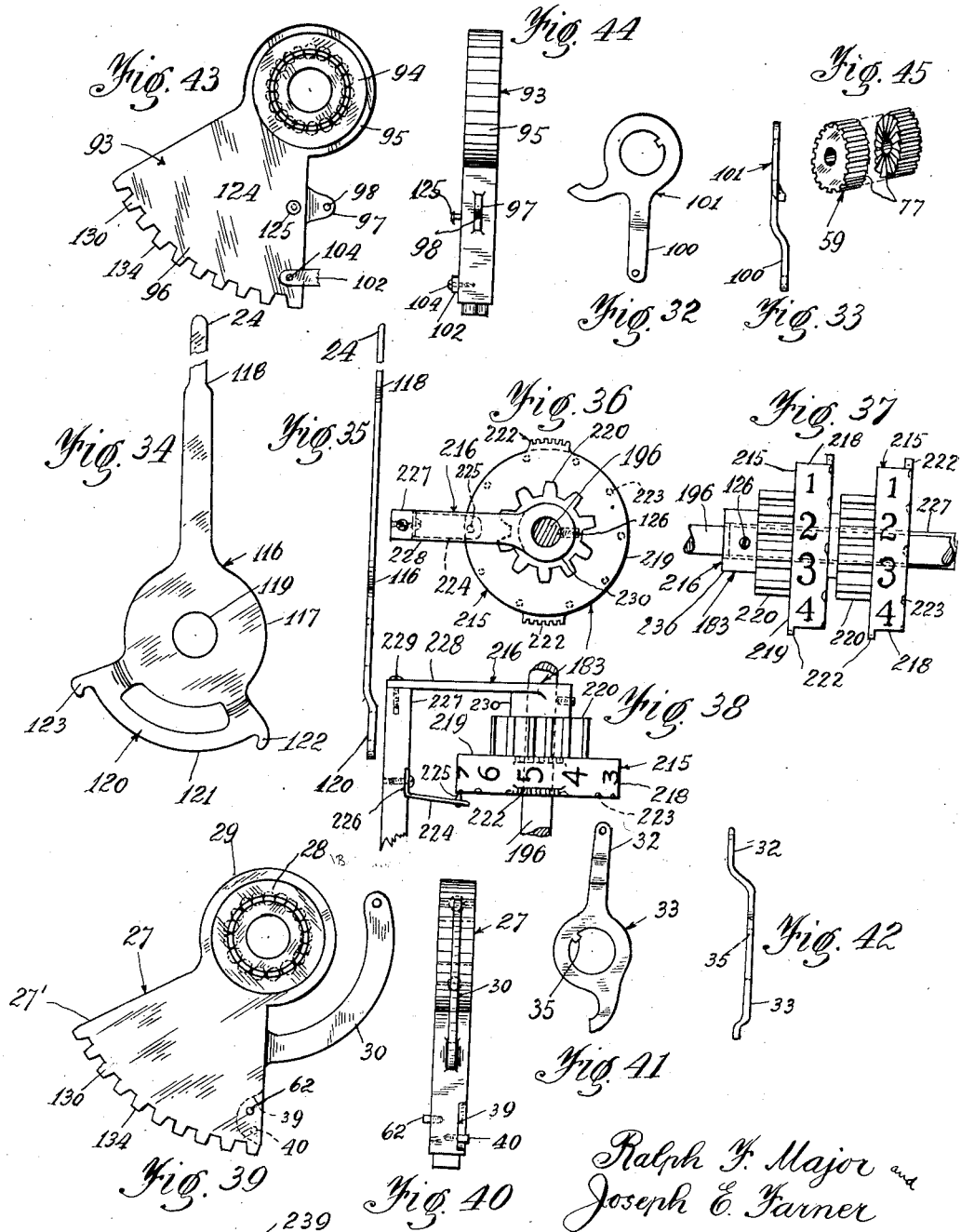

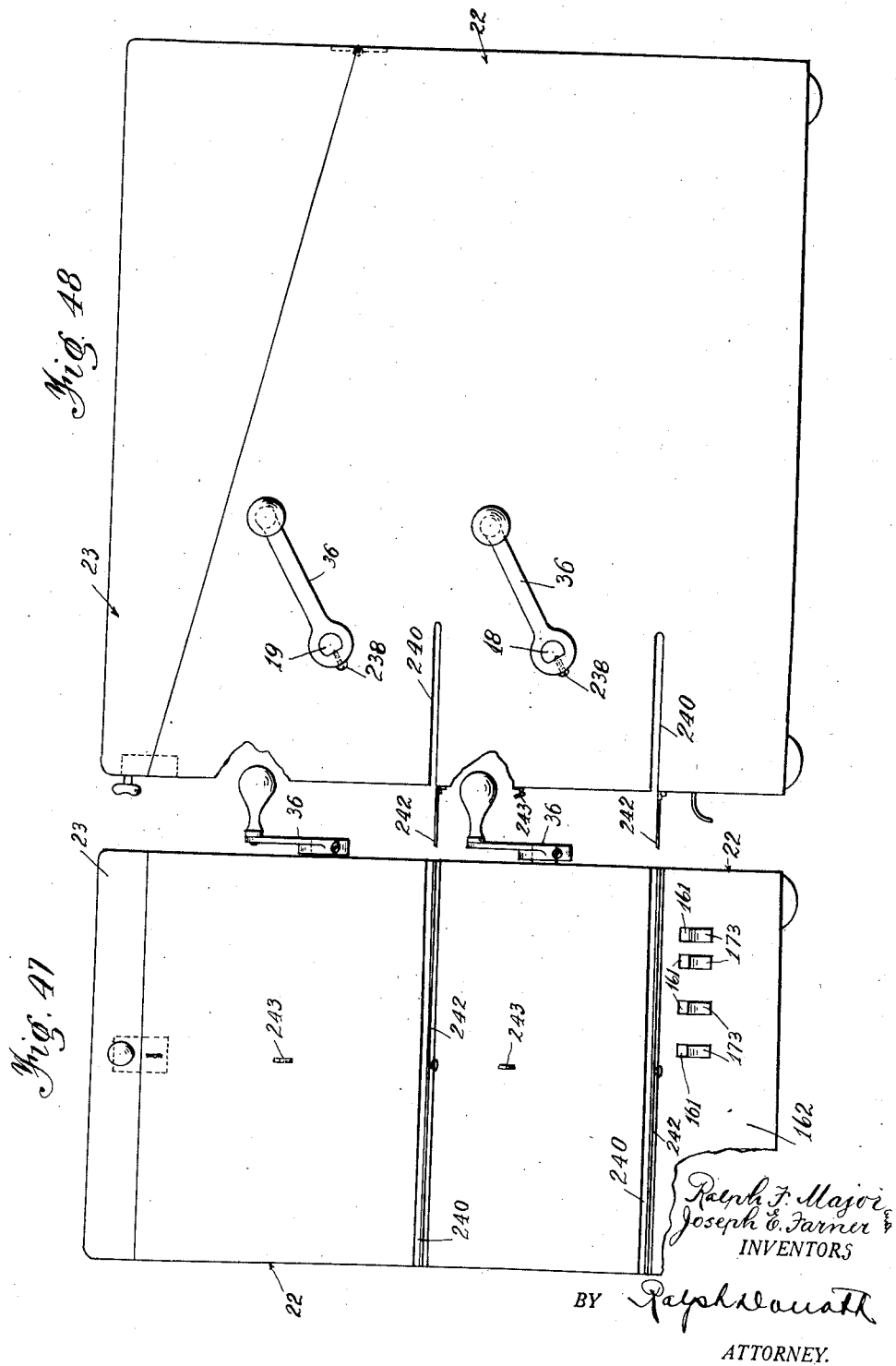

2,079,624

UNITED STATES PATENT OFFICE 2,079,624

MEANS TO PREVENT FRAUDULENT MANIPULATION OF SHEETS IN LOOSE LEAF SYSTEMS

Ralph F. Major and Joseph E. Farner, Pittsburgh, Pa.

Application January 21, 1933, Serial No. 652,858

10 Claims. (Cl. 235—58)

Our invention aims to provide method and means which are adapted to prevent fraud by substitution or other improper manipulation of sheets in loose leaf systems.

It is, accordingly, one of the objects of the present invention to provide a machine by which a loose leaf sheet of a book of account cannot be substituted or destroyed without detection.

Another object of this invention is to provide a machine of the character described which controls the additions and removals of sheets ordinarily used in loose leaf systems.

Yet another object of this invention is to provide a machine of the character described with a visible control or accumulator by means of which the sheets in the book of account so controlled are authenticated.

Still another object of this invention is to provide a machine of the character described which consists of two distinctive parts, each part controlled by a different party.

Still another object of this invention is to provide a machine of the character described with means which make it impossible to operate either part of the machine without affecting the accumulator.

Yet another object of this invention is to provide a machine of the character described which automatically identifies and controls the sheets of a book of account.

To the accomplishment of these and such other objects as may hereafter appear, the invention consists of the novel construction, combination and arrangement of parts herein specifically described and illustrated in the accompanying drawings, wherein is shown an embodiment of the invention, but it is to be understood that changes, variations and modifications may be resorted to which come within the scope of the claims hereunto appended.

In the drawings wherein like numerals of reference designate corresponding parts throughout the several views, Figure 1 is a longitudinal side elevation taken along line 1—1 in Figure 5, the locking device and the operating handle being shown in dot and dash lines, and the various bars in normal position.

Figure 7 shows a side elevation of the date segment stop bar mechanism of the device.

Figure 8 is a top elevation of Figure 7.

Figure 9 is a detail top view of the subtracting bar, including the auxiliary bar, cam and number wheel.

Figure 10 is a side elevation of Figure 9, showing the subtracting, adding and auxiliary bars, the number wheel and the cams being in contact with the auxiliary bars.

Figure 11 is a side elevation of the adding bar, showing the auxiliary bar out of contact with the cam.

Figure 12 shows an isometric view of two cams mounted on a shaft, the balance of said cams being broken away.

Figure 13 is an isometric view of one of the pinion-cams controlling the auxiliary bars also shown in Figure 6.

Figure 14 is a rear elevation along line 14—14 in Figure 3 showing part of the addition stop bar mechanism.

Figure 15 is a side elevation of the platen lift-bar mechanism.

Figures 16 and 17 are front and side elevations of the platen operating mechanism, partly in section.

Figure 18 is a top view of the platen mechanism and its associated parts.

Figure 19 is an isometric view of a cam pinion as used for the addition part of the mechanism.

Figures 20 and 21 are side and front elevations of the accumulator shift-arm and its associated parts.

Figure 22 is an enlarged cross-sectional elevation of the upper part of Figure 20, through the center of the same.

Figure 23 is a cross-sectional view along line 23—23 in Figure 22.

Figure 24 is a side elevation of the controlling mechanism as shown in Figure 6, governing the engagement of the accumulator and the addition and subtracting bars.

Figure 25 is a side elevation, similar to the lower mechanism of Figure 24, the accumulator shaft being out of engagement of the cam step.

Figure 26 is an end elevation of one of the mechanisms shown in Figure 24.

Figure 27 is an isometric view of the bell-crank as used in Figures 28 and 29.

Figure 28 is a front view of the mechanism which locks the operating handles.

Figure 29 is a side elevation of Figure 28, showing in full lines the locking device in one position and in dot and dash lines the locking device in the other position.

Figure 30 is a top view of the indicator plate as used for the subtracting mechanism of the device.

Figure 31 is a top view of the plate as used in connection with the shifting lever as shown in Figure 29.

Figure 32 is a plan view of a circular disc having an arm to pull and a heel to return the segment shown in Figures 43 and 44.

Figure 33 is a side elevation of Figure 32.

Figure 34 is a plan view of one of the operating handles which regulates the movement of the segments in the subtracting part of the device.

Figure 35 is a side elevation of Figure 34.

Figure 36 is an enlarged plan view of a number wheel of the accumulator and associated parts showing the means of preventing the number wheel from turning when not in engagement with the adding or subtracting bars.

Figure 37 is a side view of Figure 36.

Figure 38 is a bottom view of Figure 36.

Figure 39 is a plan detail view of a segment, as used in the adding part of the device.

Figure 40 is a side detail view of Figure 39.

Figures 41 and 42 are views similar to Figures 32 and 33.

Figure 43 is a plan detail view of a segment as used in the subtracting part of our invention.

Figure 44 is a side detail elevation of Figure 43.

Figure 45 is an isometric view of a split pinion with spiral jaws.

Figure 46 shows the top part of a ledger sheet as imprinted with our device.

Figure 47 is a front outline view of the device.

Figure 48 is a side outline view of the device.

In a general way, the machine consists of two distinctive appliances, each appliance being manipulated by different persons; for example, the bookkeeper and the auditor, and the purpose of this invention is to afford a control of the sheets of a loose leaf book, particularly books of account, and to eliminate the possibility of defrauding by means of duplication or replacement of sheets. A large proportion of defalcations is due to the fact that a double set of sheets may be kept, one set being for the purpose of audit and the other fraudulent set for use of the bookkeeper. With our device, the bookkeeper assumes responsibility for each loose sheet placed in the book of account until it is removed by the auditor. Each sheet is thus a prima facie evidence of its authenticity.

Our invention aims to prevent manipulation or fraudulent substitution of sheets in loose leaf books of account, as no sheets may be removed without proper authorization, and it thus combines the best features of the bound book with the flexibility of the loose leaf book of account.

Our device prints the numbers of the sheets in numerical sequence and automatically accumulates the total of such numbers; for instance, consider a book of account with five sheets. The bookkeeper inserts each sheet and by means of an operating crank the device numbers them on the upper left-hand corner, viz.: one—two—three—four and five. The total of these numbers is accumulated, and in this case is fifteen. When the book of account is audited the sheet numbers are added, and, if all five sheets are in the book of account, the total is fifteen. The auditor now knows that the sheets in the book of account are authentic, for the total of the sheet numbers agrees with the total in the accumulator.

If sheet number four is to be discontinued and removed from the book of account, the bookkeeper requires the assistance of another person, whom we will call the "auditor", to take it from the book of account. The auditor unlocks the machine, and, after setting it in the subtract position, inserts the sheet and stamps its number in the upper righthand corner (all sheets taken from the book of account thus show the number in three places). This operation subtracts four from the total, which in this case is now eleven, the sum of the four remaining sheets in the book of account.

Of course, it should be noted that the bookkeeper may remove sheets from the book of account for posting at any time, and, if they are returned to the book of account, the number balance will not be affected.

It is also to be noted that the device, as we are now about to begin to describe in detail, is so constructed that the addition part of the device permits printing the same number twice, if it should be necessary, to show the information on both sides of the sheet. On every second operation of the handle the next consecutive number is set in the machine preparatory to printing the next sheet.

Figure 2:
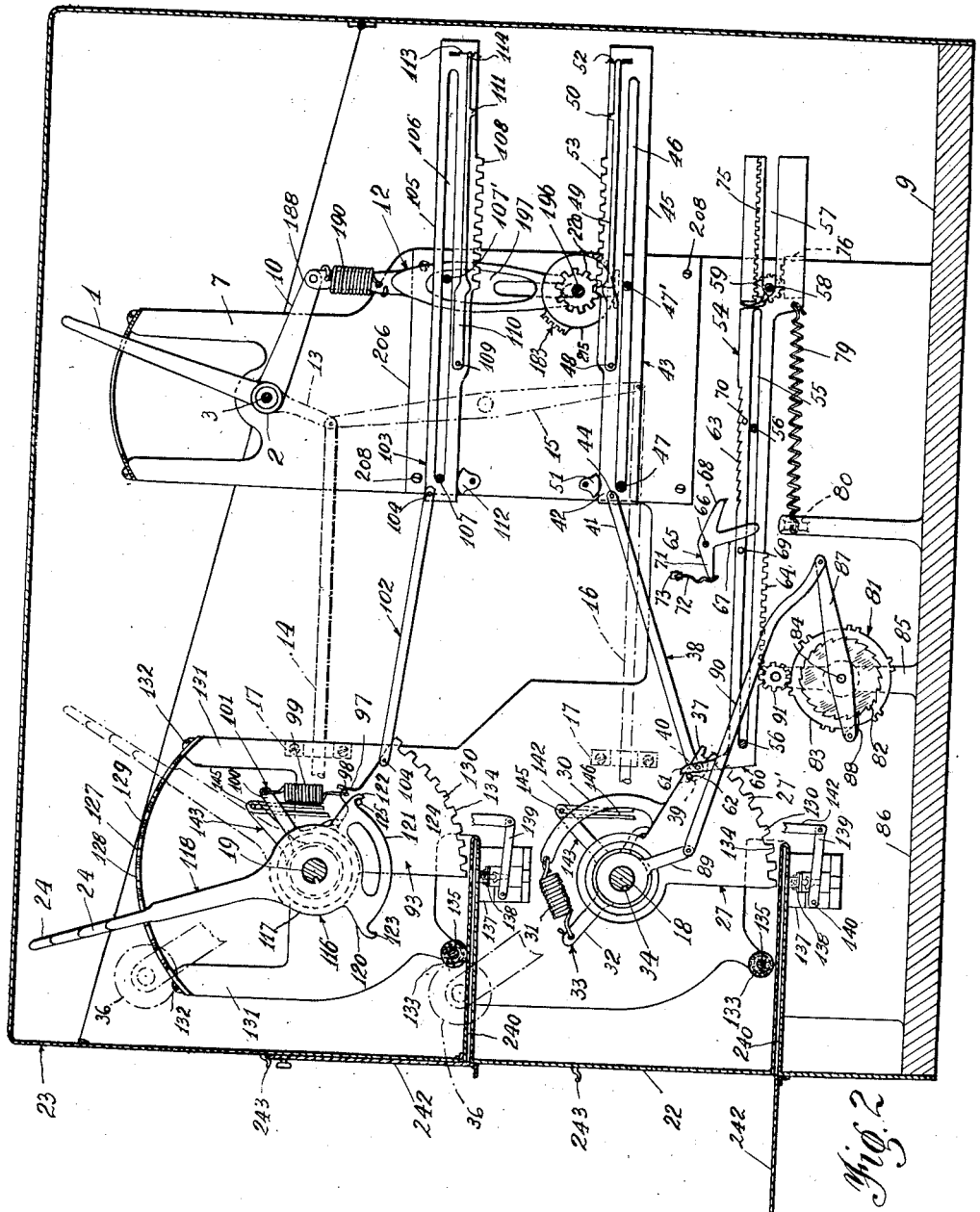
Figure 2 is a view similar to Figure 1, showing the various bars in extreme position.

Should it be desired to number the sheet on one side only, a slight change of the mutilated gear shown best on the bottom of Figure 2 and cam shown in Figure 25 would be required.

For convenience, we will now describe our invention with reference to the different functions of the device in the order in which they are performed, as far as possible, i. e.

Accumulator shift lever and automatic locking device,
Adding mechanism,
Automatic consecutive numbering mechanism,
Subtracting mechanism,
Inking and printing mechanism,
Dating mechanism, for the addition part of device, and
Accumulator mechanism.

*Accumulator shift lever and automatic locking device*

Figure 4:
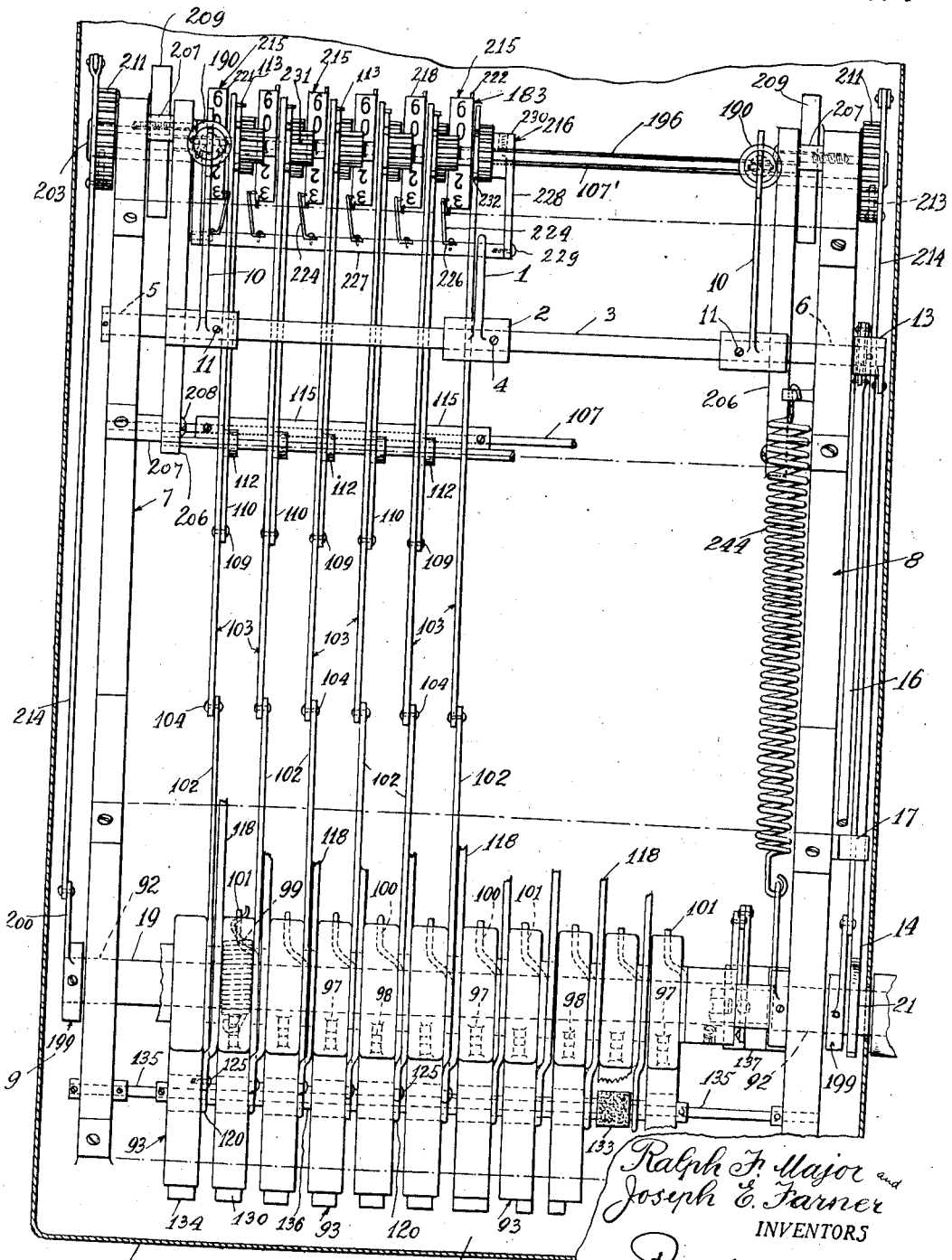
Figure 4 is a cross-sectional top elevation along line 4—4 in Figure 1 showing the subtracting mechanisms of the device.

Referring especially to Figures 1, 2, 4, 27 to 29 inclusive, of the drawings, the accumulator shift lever and automatic locking device comprises a shift-lever 1 having a hub 2 and secured to a rod 3 by means of a set-screw 4 (see Figure 4). Said rod 3 is rockably supported in suitable bearings 5 and 6 in the sides 7 and 8 of the frame 9. Rod 3 also carries two connecting bars 10, which are secured thereto by means of set-screws 11. The ends of said connecting bars 10 are pivotally attached to the accumulator shift-arm 12.

The operating-handle end of rod 3 has a bell crank 13 (Figure 27) consisting of two arms, one arm of which is attached to the end of the fork 14, and the other arm of which connects to the upper end of the rock-bar 15. A similar fork 16 is pivotally attached to the lower end of said rock-bar 15. Forks 14 and 16 are guided by means of guide blocks 17. The parts of the lower and upper rock-shafts 18 and 19, respectively, over which the fork-ends 20 and 21 slide, are slightly flattened, thus preventing the shafts from turning when either of the fork-ends 20 or 21 is in engagement. It will be noted that only one rock-shaft may be locked at any time.

Adding mechanism

In general, the device comprises a casing 22, a frame 9, and a lockable cover 23, which permits access to the tops 24 of the operating levers 1 and 118.

A lower rock-shaft 18, supported in suitable bearings 25 and 26 in the sides 7 and 8 of the frame 9, is provided to hold a series of type-carriers 27.

Referring especially to Figures 1, 2, 3, 5, 39, and 40, said type-carriers 27 comprise a ball bearing 28, which fits snugly on said rock-shaft 18. Around the outer rim of said ball bearing 28 is pressed rigidly the hub 29, which is preferably made in one piece with the segment 27'. A hook-shaped extension 30 is provided on said segment which holds one end of a coil spring 31, the other end of the latter being hooked into the arm 32 of the pull and return lever 33. The rock-shaft 18 is provided with a keyway 34, into which the key part 35 fits, by means of which said pull and return lever 33 is held in a certain position in relation to the operating crank 36. The forward end 37 of the link 38 is pivotally mounted in the recessed part 39 of the segment 27' by means of a pin connection 40, and the rearward end 41 of said link 38 is pivotally mounted on the front end 42 of the addition bar 43 by means of the pin connection 44.

The addition bar 43 comprises an elongated flat bar 45, provided with a longitudinal slot 46 for the reception of the guide rods 47 and 47', and a nine-tooth rack 53 on the upper edge of said bar. On the side of the upper part of said addition bar 43 is pivotally mounted by a pin 48 the auxiliary bar 49, which carries a supplementary tooth 50, and is actuated by a cam 51. A two-step flat spring 52, fastened on the side of the addition bar 43, holds the auxiliary bar 49 in normal, or in operating position. The said guide rods 47 and 47' are supported in the sides 7 and 8 of the frame 9 for sliding movement of the addition bar 43.

Automatic consecutive numbering mechanism
*(Figures 1, 2, 3, 5, 6, 39 to 42)*

The same consists of an elongated bar 54, having a horizontally disposed long slot 55 for the reception of the guide rods 56, and another horizontally disposed short slot 57, open at its rear end to permit the passage of the shaft 58, carrying the split pinions 59, having spiral jaws, the purpose of which will be described later. The front 60 of said bar 54 is provided with an enlarged portion 61 which serves to stop the movement of the segment at the desired position by means of a stop-pin 62 located on the face of the segment 27 (Figures 1, 2, 3, 14, and 39). In parallel alignment with slot 55 are the ratchet-racks 63, and the gear-racks 64, the first mentioned being located on top and the latter on the bottom of bar 54. A three-armed pawl 65 is mounted for pivotal movement on a shaft 66, the ends of the latter being rigidly held in the sides 7, 8 of frame 9 in any suitable manner.

Figure 1:
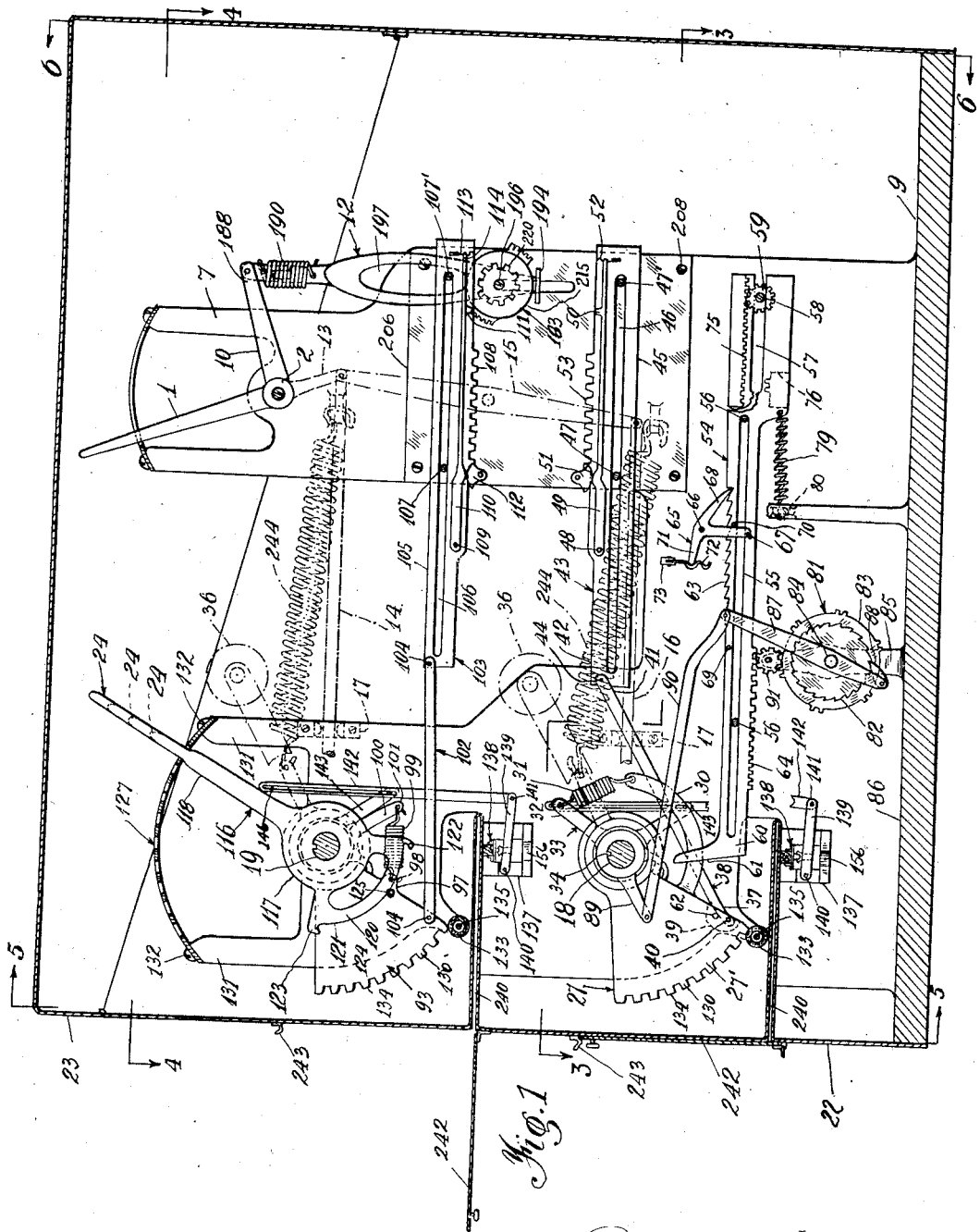
Figure 3:
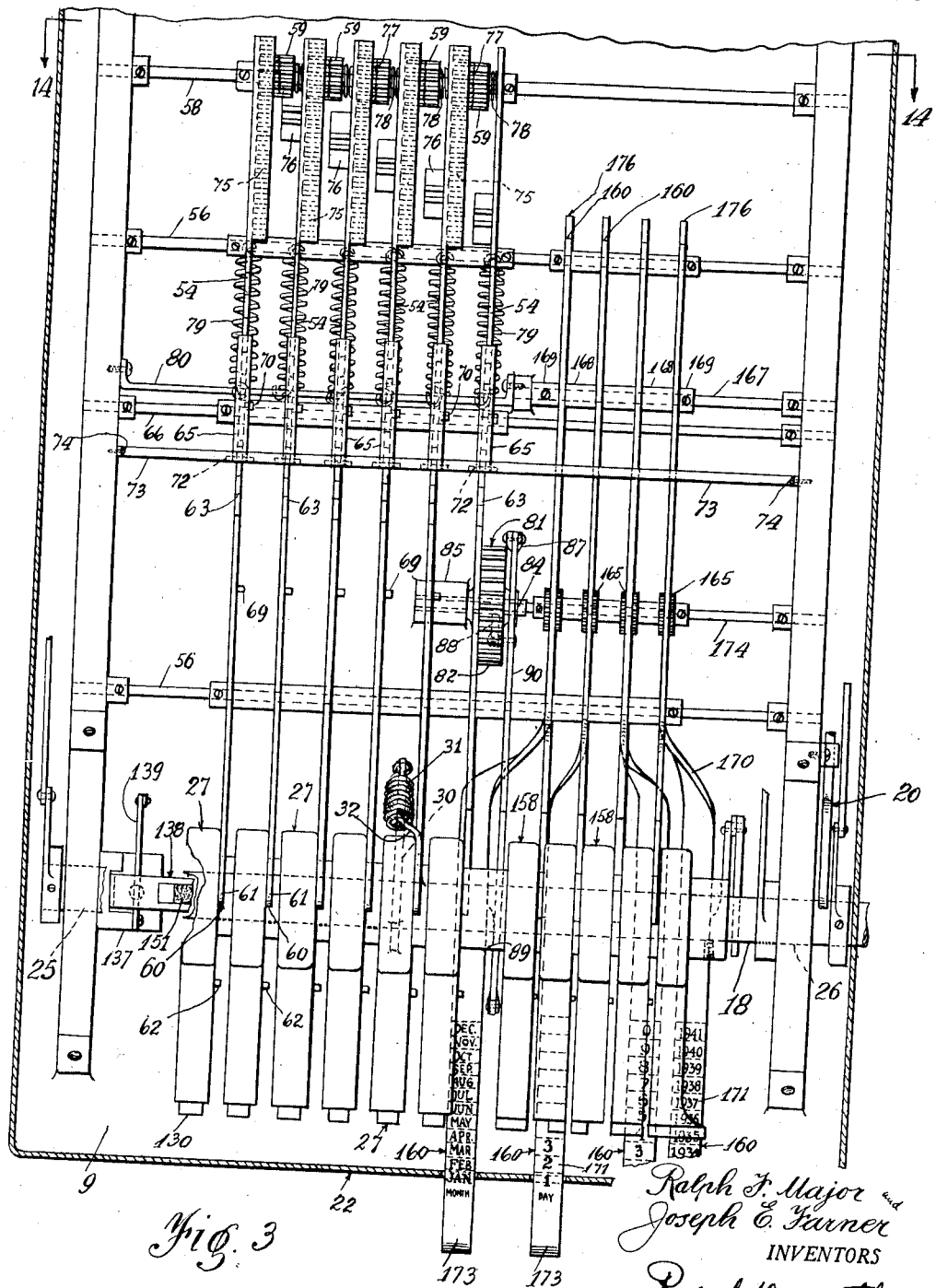
Figure 3 is a cross-sectional top elevation along line 3—3 in Figure 1, showing the automatic segment stop bar mechanisms of the device.

Each of the arms of said pawl 65 is designed to serve a certain purpose, for instance, the depending arm 67 serves to engage or disengage the pawl-arm 68, in or out of engagement of the ratchet teeth 63 by means of the pins 69 and 70 mounted on the side of the bar 54 and best shown in Figures 1, 2, and 3. Arm 71 of said pawl 65 serves to retain said pawl arm 68 in two different positions by means of a two-step flat spring 72, rigidly fastened to a supporting bar 73, which is secured to the sides 7 and 8 of the frame 9 by screws 74.

The enlarged rear end of bar 54 has a pinion-rack 75 permanently secured to one side of said bar 54, and a two-tooth rack 76 also permanently secured to said bar 54, but on the opposite side of said pinion-rack 75 (see Figures 3 and 14). Both of said racks 75 and 76 mesh with said split pinion 59.

Referring especially to Figure 45 of the drawings, said split-pinion 59 consists of two halves each having spiral jaws 77, normally in mesh with each other, and held together by means of a light coil spring 78 (Figures 3 and 14) between the side of bar 54 and one of the outer faces of said split-pinion 59.

A tension spring 79 fastened to the enlarged rear-end of bar 54 and to a bridge 80, returns the bar 54 to the position shown in Figure 1.

As heretofore mentioned, the device as now described is constructed to print the next consecutive sheet number on every second operation of the crank 36. This is accomplished by the mechanism designated in general with the numeral 81 (Figures 1, 2, 3, 5, and 6).

Figure 5:
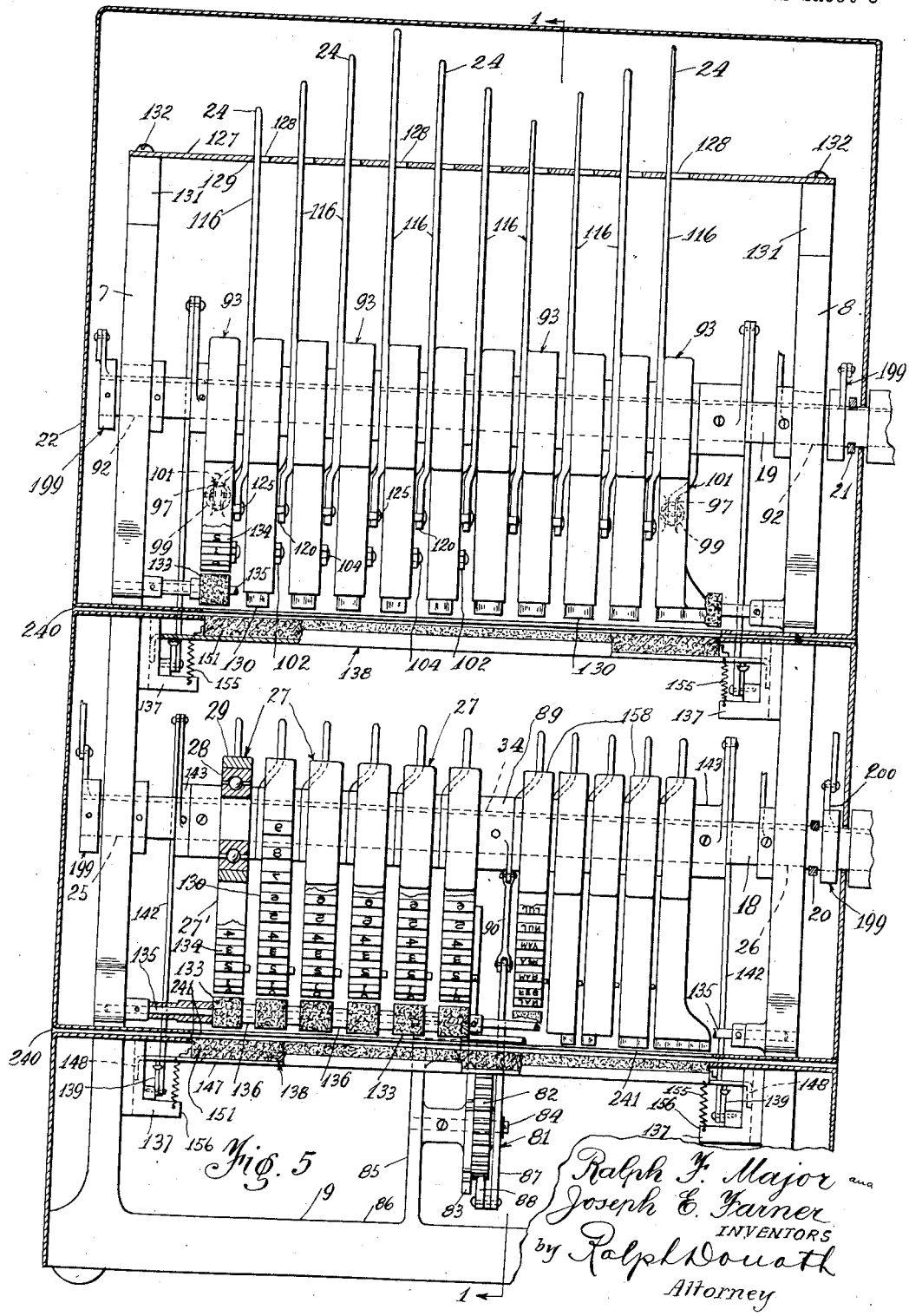
Figure 5 is a cross-sectional front view along line 5—5 in Figure 1.

The aforesaid mechanism comprises a ratchet gear 82 and a mutilated gear 83, riveted together to form a single element, and is rotatably mounted on a stub shaft 84 supported in a bracket 85 on the bottom 86 of the frame 9. A pawl-lever 87 is rockably mounted on said stub shaft 84 and having a pawl 88 which is in engagement with one of the teeth of the ratchet gear 82. Said pawl-lever 87 is connected to the crank 89 by means of a connecting link 90, said crank 89 being pinned to the rock-shaft 18 (Figure 5). Mutilated gear 83 acts upon a pinion 91 which is mounted in alignment with the rack 64 of bar 54 and said mutilated gear 83.

Subtracting mechanism

This mechanism is of similar construction to the adding mechanism heretofore described, with the exception that the operation of the subtracting mechanism is manually controlled whereas the adding mechanism is automatically controlled.

In general, the subtracting mechanism includes the rock-shaft 19 supported for rocking movement in the bearings 92 provided in the sides 7 and 8 of the frame 9. A series of type-carriers 93 (Figures 1, 2, 4, 5, 6, 43, and 44) are snugly mounted on said rock-shaft 19 and are of similar construction as the one heretofore described for the adding mechanism. The type-carrier 93 comprises a ball bearing 94 around which the hub part 95 at the segment 96 is rigidly fitted. Said segment has an earlike extension 97 with an aperture 98 for the engagement of one end of a coil spring 99. The other end of the latter being connected to the arm 100 of the pull and return lever 101 (Figures 32 and 33).

A link 102 is pivotally connected between the type-carrier 93 and the front end of the subtraction bar 103 by means of pin connections 104.

The subtraction bar 103 comprises an elongated flat bar 105 having a longitudinal slot 106 for the reception of guide rods 107 and 107', and a nine-tooth rack 108 on the lower edge of said bar 105. On the side of the lower part of said subtraction bar 105 is pivotally mounted by means of a pin 109 an auxiliary bar 110 equipped with a supplementary tooth 111, said auxiliary bar 110 being actuated by a cam 112 (Figure 12). A two-step flat spring 113 of the same construction as the one described for the addition bar 43 is fastened on the side of the bar 105 and in engagement with the tip 114 of the auxiliary bar 110. The above mentioned guide-rods 107 and 107' are supported in the sides 7 and 8 of the frame 9 for sliding movement of the subtraction bar 103. If desired a sleeve could be provided on guide rods 107 to provide antifriction means on the subtraction bar 103 when moving.

To keep said subtraction bar 103 in proper alignment with the cooperating elements we provide ferrules 115 (Figure 4).

The extent of the movement of the type-carriers 93 is limited by means of selectors 116 (Figures 1, 2, 34, and 35). The latter comprises a circular disc 117 provided with a handle 118 and a central aperture 119. Opposite said handle 118 said disc 117 is provided with a radial apron 120, the outer edge 121 of which is concentric with aperture 119 and either end of said radial apron 120 has stop-ears 122 and 123.

The selectors 116 are rotatably mounted on the rock-shaft 19 between the type-carriers 93 and the pull and return lever 101 (Figure 5). In order to clear the said pull and return lever 101 the radial apron 120 is slightly curved so as to come in alignment with the face 124 of the type-carrier which it controls.

Referring again to Figures 1 and 2 of the drawings, the aforesaid selectors 116 cooperate with pins 125, located on the face 124 of the type-carrier 93.

When setting the selector 116, the edge 121 of the apron 120 is always in contact with the pin 125, and the movement of the type-carrier 93 is stopped when said pin 125 reaches stop ear 122.

For convenient manipulation the exposed ends 24 of the handles 118 are staggered.

By reference to Figures 1, 2, 5, and 30, a selector indicator plate 127 is provided, comprising a series of parallel slots 128 and a series of notches 129 in said slots, each of said slots 128 representing a corresponding type-carrier 93, and each of said notches representing a corresponding character or type 130 of said type-carrier 93.

The previously mentioned selector indicating plate 127 is fastened to the top of the upwardly extending supports 131 of the sides 7 and 8 of the frame 9, by means of screws 132. To allow proper movement of the selector handles 118, the said selector indicating plate 127 is of arcuate shape, as best shown in Figures 1 and 2.

*Inking mechanism*

Referring especially to Figures 1, 2, and 5, the inking mechanism comprises a plurality of inking rollers 133, revolubly mounted in close proximity to the face 134 of the type 130 of the type-carriers 27 or 93 on a shaft 135 and kept in proper alignment with said type-carriers 27 or 93 by suitable spacers 136.

At the zero position of the type-carriers 27 or 93 (Figure 1) said inking rollers 133 begin to apply the ink to the face 134 of the type 130 of said type-carriers, and when the type-carriers come into the extreme position (Figure 2) all of the type has been inked by this method. Of course, it is obvious that ink must be applied to the rollers as needed.

*Printing mechanism*

The essential parts of the printing mechanism (see Figures 1, 2, 5, 15 to 18 inclusive) consists of a pair of guide blocks 137 in which a platen 138 is slidably engaged, a socket arm 139 pivoted at end 140, and connected by means of a pivot connection 141 to a slotted link 142. Keyed on the rock-shaft 18 or 19 is a crank 143 having an arm 144 which has a pin 145, said pin being in engagement with slot 146 of the slotted link 142.

The platen 138 comprises a flat bar 147, the ends 148 of which are bent downwardly to form an angle so as to be adapted to serve as a guide in said guide blocks 137. On the upper part of said flat bar 147 are welded or otherwise secured angle pieces 149 and 150 to provide an oblong pocket for the reception of the cushion pad 151 made of yieldable material, such as soft rubber. Near the downwardly bent ends 148 of said flat bar 147 are riveted pins 152 having a rounded head 153 and being seated in the sockets 154 fastened to the socket arms 139. Underneath each end of said platen 138 an expansion spring 155 is fastened to the flat bar 147 and to the extended bottom 156 of guide blocks 137 by means of eye bolts 157.

*Dating mechanism for the addition part of device*

As best shown in Figures 3, 7, and 8, the dating mechanism for the addition part of the device comprises four type-carriers 158 which are provided with the months, days and years, and a stop pin 159, but are otherwise of a similar construction to the ones previously described and designated with the numeral 27, with the exception that the recessed part 39 is omitted.

To stop the said type-carriers 158 at the desired date, we have provided date selector levers 160 which protrude through slots 161 in the front part 162 of the case 22. These date selector levers 160 comprise elongated levers 163 having pinion racks 164 which mesh with pinions 165. Each of said levers 160 is provided with a longitudinal slot 166, and supported for sliding movement on guide rods 167 and held in proper alignment by means of ferrules 168 and held together by collars 169.

The date selector levers 160 are preferably made in one piece, so as to permit a twist of said lever at 170. The object of twisting said levers 160 is to obtain a flat surface, on the top of which the months, days and years 171 are imprinted or stamped. Directly beneath said imprinted months, days and years are serrations 172, each notch of the latter representing one of the characters 171. The protruded end 173 of the date selector lever 160 is turned downwardly to provide a finger hold for the same.

As previously stated, the lower side of the pinions 165, revolving on a spindle 174, is in mesh with pinion racks 164 of the date selector levers 160. Another rack 175 is provided on the lower edge of the date segment stop bars 176, which meshes with the upper side of said pinion 165. By this arrangement, when the date selector lever 160 is pulled forwardly, the date segment stop bar 176 traverses backwardly the same distance.

The date segment stop bar 176 comprises an elongated strip 177, the front 178 of which being provided with an enlarged portion 179 which cooperates with said stop pin 159. A longitudinal slot 180 and disposed about midways of the lower and upper edge of said strip 177 is in parallel alignment with said rack 175 on the lower edge of strip 177. Guide rods 56 support said date segment stop bars 176 for sliding engagement in the same manner as guide rods 167 previously described.

*Accumulator mechanism*

The accumulator mechanism (Figures 1, 2, 4, 6, 9 to 13 inclusive, 19 to 25 inclusive, and 36 to 38 inclusive), includes a series of previously described subtraction bars 103 and addition bars 43 (Figures 1, 2, 9, 10, 11), a pair of accumulator shift arms 12, cooperating with the cam mechanism 182 (Figures 22, 24, 25) and the counters 183.

The accumulator shift arms 12 (Figures 19, 20, 21) comprise a substantial flat arm 184 which terminates on its upper end into a round portion 185 having a shouldered extension 186 over which is slidably engaged the clevis 187 which engages the free end 188 of the connecting bar 10. Coiled around the round portion 185 of the flat arm 184 and the round part 189 of the clevis 187 is an expansion coil spring 190, the ends of which are held in the apertures 191 and 192 of said clevis 187 and of said rounded portion 185 of the arm 184. By this arrangement an expansion of the accumulator shift arm 12 is thus permissible. The lower end 193 of said accumulator shift arm 12 terminates into a T shaped bent up extension 194 holding one end of a substantial small coil spring 195 and the other end of which embraces the accumulator shaft 196. The middle part of said arm 184 has a cut out portion 197 so as to provide clearance for the guide bar rod 107'. The lower end 193 of said accumulator shift arm 12 is provided with a short vertically disposed slot 198 to permit up or down movement of the accumulator shaft 196.

The cam elements for the addition part of the device (lower part of Figures 22, 24, and 25) consist of a crank 199 provided with an arm 200 and securely held by means of a set screw 201 on the rock shaft 18. A cam 202 is pinned to a stub shaft 203 and supported between bearings 204 and 205 of a plate 206 and the side 8 of the frame 9. Said plate is held sufficiently distant by means of distance sleeves 207 and screws 208 to provide guiding means for said cam 202.

As will be noted in Figure 24, the construction of the cam elements are identical for the addition and the subtraction part of the device, with the exception that the cam 202 for the addition part is of a two-step design and the cam 209 for the subtraction part is of a four-step design. The outer end 210 of said stub shaft 203 is provided with a ratchet gear 211, also pinned to said stub shaft 203. A pawl lever 212 has pivotally supported a pawl 213 which is in engagement with said ratchet gear 211. A connecting link 214 is in pivotal engagement with said arm 200 of crank 199 and said pawl lever 212.

Figure 6:
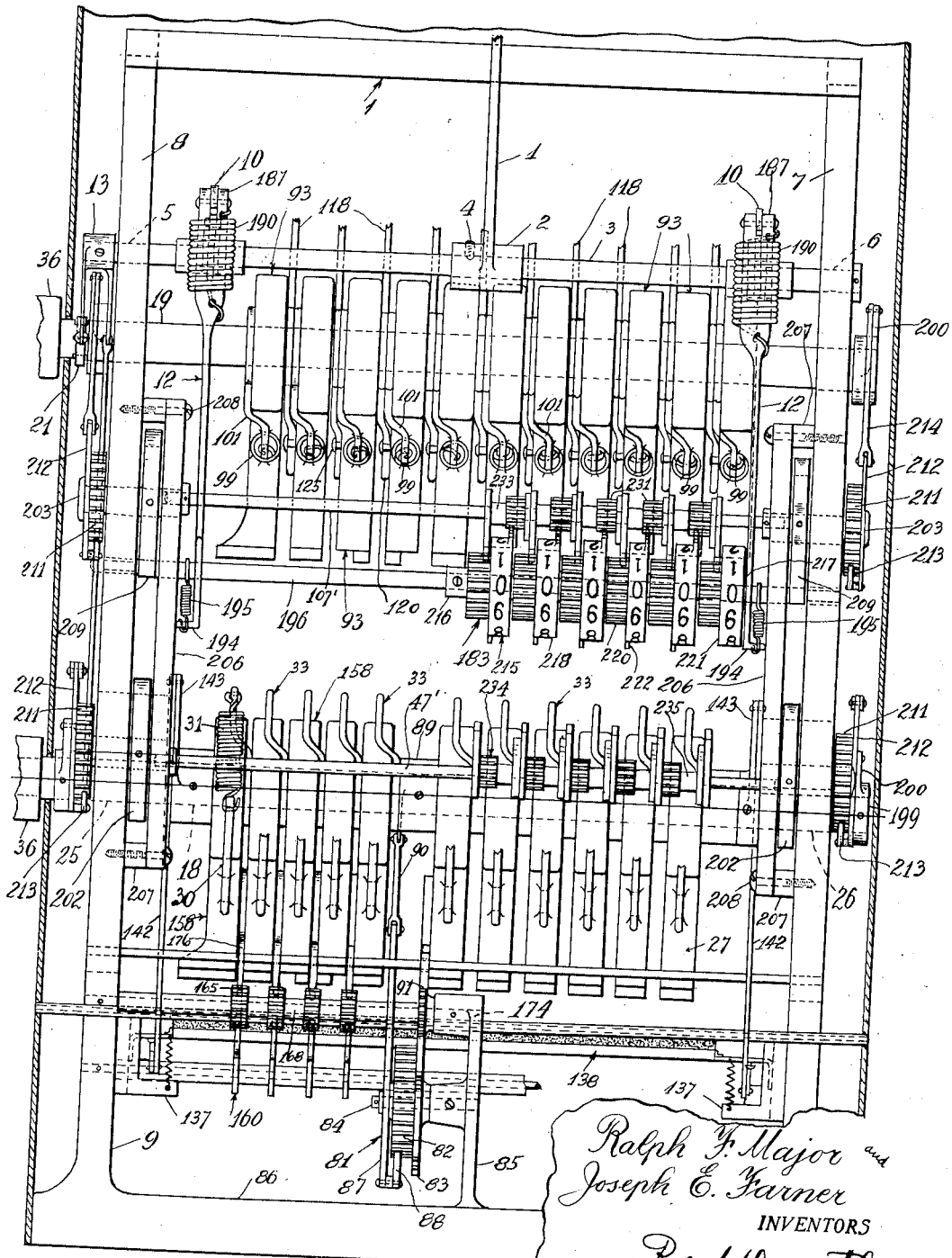
Figure 6 is a cross-sectional rear elevation along line 6—6 in Figure 1.

By reference to Figures 1, 2, 4, 6, and 36 to 38 inclusive, the counter 183 includes six number wheels 215 adapted to freely rotate on the accumulator shaft 196 and held in proper alignment by a collared bracket 216 on one end, and by a washer 217 on the opposite end of said counter 183. This washer 217 is held against said counters 183 by the lower end 193 of the accumulator shift arm 12 (Figure 6). The faces 218 of the number wheels 215 have imprinted the numerals 0 to 9 inclusive.

Figures 36 to 38 inclusive show enlarged detail views of the number wheels, each comprising a cylindrical body 219 having concentrically and integrally united therewith a gear wheel 220. The faces 218 of the number wheels 215, with the exception of the end wheel numbered 221 (highest order wheel) are each provided with a pair of radially extended gear cams 222, which are located 180° apart and on the opposite edges of the number wheel 215.

To prevent unintentional movement of said number wheels 215, the latter are provided on the outer side of said wheels with ten indentations 223, each representing a number on said wheel 215, and are in engagement with flat yielding springs 224, each having a contact pin 225 rigidly fastened thereto. Said spring is held in a recess 226 provided in the spring supporting bar 227, and the ends of said bar are attached to the arms of the collared brackets 228 and held by means of screws 229. The collar 230 of the collared bracket 216 is securely held to the accumulator shaft 196 by means of set screws 126.

When the accumulator shift arms 12 are in subtracting position, as especially shown in Figures 1, 4, 6, and in full lines in Figure 10 of the drawings, the radially extended gear-cams 222 of the number wheels 215 are in mesh with cam pinions 231, Figure 13, the latter being provided with a four-stage cam 232 integrally with a pinion 181, and supported for free rotation on the subtraction guide bar rod 107', and held apart by sleeves 233.

When the accumulator shift arms 12 are in adding position (Figure 2), the radially extended gear-cams 222 of said number wheels 215 are in mesh with cam-pinions 234 (Figure 19). The latter being of similar design to cam-pinions 231 with the exception that a sleeve 235 integrally unites the pinion 236 with the four-stage cam 237.

These aforesaid cam-pinions 234 are mounted for free rotation on the addition guide bar rod 47' and held in proper alignment with the cooperating mechanism by the adding guide bar 43.

As shown in Figures 47 and 48 of the drawings, operating cranks 36 are rigidly secured to the protruding ends of the rock shafts 18 and 19 by set screws 238.

To insert a loose leaf sheet 239 the case 22 is provided with an upper and a lower horizontally disposed slot 240, extending from side to side (Figures 1, 2, 17) of said case 22, and having oppositely disposed longitudinal slots 241 which come in alignment with the platen 138.

To provide an additional support for the loose leaf sheets 239 when the device is in use, suitable shelves 242 are hingedly secured to the outside of the case 22, and when not in use these shelves 242 may be flapped back and held in place by snaps 243 of any standard make.

*Operation*

As stated previously, the principal purpose of our invention is to provide method and means which control the sheets of a loose leaf book of account, particularly ledgers, and to eliminate the possibility of defrauding by means of duplication or substitution of said sheets.

Before describing the operation of our invention, it is essential to know that there are two main sections of our machine, i. e., the imprinting and adding section of the device and the imprinting and subtracting section of the device.

The operation of the adding mechanism (lower part of the machine) is automatic and is actuated by the bookkeeper, and the subtracting mechanism (upper part of the machine) is manually actuated by the auditor.

Assume that the machine is locked by a key, which is in the possession of the auditor, and the shift lever 1 is in a position as shown in Figure 2, thereby locking rock shaft 19 by the fork 14, and thus depriving the function of the "subtracting" part of the machine. The only parts of the machine accessible to the bookkeeper are the upper and lower longitudinal slots 240 and the upper and lower actuating cranks 36, and since the said rock shaft 19 is locked, the upper crank 36 is also locked. This would make it useless to insert a sheet in the upper slot 240 as no imprints could be effected. It is further assumed that the accumulator or counter 183 is set to zero (as shown in Figure 6). This makes the machine now ready for use of the bookkeeper. First, the date is set by slightly raising and sliding the date selector levers 160 in or out of the slots 161 in the front of casing 22 (Figures 7 and 8). Each serration 172 on the bottom of said selector levers 160 corresponds with a character as printed on the protruding ends 173 of the latter. All sheets in the book of account are imprinted on the upper left-hand corner with consecutive page numbers (same page number on both sides of each sheet), also the date and the serial number, by means of the lower section of the machine.

To imprint a sheet with page numbers, date and serial number, the bookkeeper inserts sheet #1 in the lower longitudinal slot 240 of the case 22, and turns the crank 36 counter-clockwise from a normal position as shown in Figure 1, to a position as shown in Figure 2. By so doing the desired characters of the segments 27 are brought into printing position and in alignment with the longitudinal slot 241 and the platen 138, and held in the selected position by means of the stop pins 62 and 159 and the cooperating elements.

Inasmuch as the type-carriers 27 stop in various positions and the crank 36 must make a complete movement, it is necessary to provide a tension spring 31 between the pull and return lever 33 and the hook part 30, so as to permit the pull and return lever 33 to be brought to the extreme position (see Figure 2), regardless of where the hook part 30 of the type-carrier 27 stops.

After the type-carriers 27 are brought into selected printing positions, the printing mechanism, although operated by the same crank as the type selecting mechanism, does not come into effect until after the type-carriers 27 come in printing position. To obtain this result, a delayed action mechanism is interposed between the platen raising mechanism and the crank lever 143 in the form of a slotted link 142. As shown in Figure 1, the printing mechanism is inoperative until the crank 36 is brought forward an appreciable distance, and the pin 145 on the crank lever 143 reaches the top (Figure 2) of slot 146 of the slotted link 142, thereby raising the platen 138 against the inserted sheet of paper and the face 134 of the type 130, and it is obvious that the desired character will be printed on said sheet of paper when said platen 138 is raised and pressed against said face of the type. This mechanism thus results in interposing a time delay between the type selecting operation and the printing operation.

As mentioned before, on every second forward motion of the crank 36, a consecutive page number is printed. This permits the printing of the same page number on both sides of the sheet, and to obtain this result the mechanism enumerated 81 is provided, and the function of the same is as follows:

As the crank 36 is actuated forward, the pawl 88 is in idling engagement with ratchet gear 82, and the mutilated gear 83 is, therefore, at a standstill, but when the crank 36 is returned to its normal position by means of the coil spring 244, said pawl 88 engages the teeth of ratchet gear 82, and, since the mutilated wheel 83 is rigidly united with said ratchet gear 82, it turns the mutilated wheel 83 one-twelfth of a revolution, or on every second return of the crank 36 the mutilated wheel will have turned one-sixth of a revolution. This brings the pair of teeth of said mutilated wheel 83 in mesh with pinion 91, moving the stop bar 54 rearwardly the equivalent of one space on the ratchet rack 63 of said stop bar 54. By this arrangement said stop bar 54 is now set in a position to stop the type-carrier 27 for printing the next consecutive number.

After the numeral 9 has been printed twice, the return motion of the operating crank 36 brings the pin 69 on bar 54 in engagement with the depending arm 67 of the three-arm pawl 65, thereby raising arm 68 out of engagement with the ratchet rack 63, and the lower step of spring 72 holds pawl arm 71 until the pin 70 on bar 54 comes into contact with the depending arm 67 of pawl 65. This again brings the arm 68 into engagement with the first tooth of ratchet rack 63 of bar 54. Said bar 54 is returned to its normal position by spring 79.

As the bar 54 moves rearwardly, the two-tooth rack 76 (see Figures 1, 2, and 3) comes into mesh with the split pinion 59 and, due to its construction, permits the opposing spiral jaws 77 of said split pinion 59 to idle. On the return of bar 54 the said two-tooth rack comes into mesh with said pinion 59 and, by means of the interlocking spiral jaws, the adjacent stop bar is moved backwardly a distance equivalent to one space on its ratchet rack 63. As will be seen in Figure 3 of the drawings, the first of bars 54 is not provided with a rack 75 as the balance of said bars are, and for that reason Figures 1 and 2 show the top end of the second adjacent bar 54.

Referring again to Figures 2 and 20 to 26 inclusive, the accumulator shift arm 12 is in adding position, and, as the operating crank 36 was turned the first time, the addition cam 202 has been turned one-quarter of a revolution by means of the crank 199 rigidly fastened to the rock shaft 18, and a spring tensioned pawl 213, which is in mesh with ratchet wheel 211, the latter and the cam 202 being rigidly mounted on stub shaft 203; therefore, both operate in unison. By this operation the accumulator shaft 196 was raised out of the recess of the cam 202 (lower part of Figure 24) to a position as shown in Figure 25, thus expanding spring 195 (Figures 20 and 21) and permitting said shaft 196 to move slightly upwardly in slot 198 (Figures 20 and 21) without affecting the position of said accumulator shift arm 12.

As the type-carrier 27 was turned to its proper imprint position, the adding bar 43 was moved a corresponding distance on guide bars 47 and 47' by means of the connecting link 38, and, since the pinion 220 of the accumulator mechanism has been brought out of engagement with rack 53 of addition bar 43 by means of cam 202, the number wheel 215 has not been affected.

On the first return motion of crank 36, pawl 213 idles on ratchet wheel 211, leaving cam 202 and shaft 196 in a position as shown in Figure 25. At the same time the addition bar 43 returns to its normal position (Figure 1). When the operating crank 36 is turned the second time, the addition bar 43 has been moved a distance corresponding to the circumferential movement of the type-carrier 27, and cam 202 has been turned an additional quarter revolution, thus permitting shaft 196 to drop into recessed portion of cam 202, and retained in that position by coil spring 195 (Figures 20 and 21). Pinion 220 is now in engagement with rack 53 of addition bar 43. When the operating crank 36 returns to its normal position, the addition bar 43 likewise returns to its normal position, and in so returning has turned the number wheel 215 a distance corresponding to the distance the addition bar 43 has traversed; for example, one tooth on the rack 53 of the addition bar 43 corresponds to one digit on the number wheel 215.

As previously explained on page 2, the device prints the numbers of the sheets in numerical sequence and automatically accumulates the total of such numbers in the accumulator 183.

After the third sheet has been printed by first segment 27, the total of the three sheets amount to 6 (1+2+3), and, as the next page 4 is printed, the accumulator must show 10, as the total amount of pages 1+2+3+4 is 10. This is accomplished by means of the auxiliary bar 49, which carries a supplementary tooth 50, and the operation of this mechanism is as follows: (see Figures 10, 11, 19, 36 to 38).

As the digit 9 of the first number wheel appears in reading position, the radially extended gear part 222 of the number wheel 215 comes into mesh with pinion 236 of the pinion cam 234, and, as the said pinion cam 234 revolves, the cam 237 urges the auxiliary bar 49, which is attached to the side of the second addition bar, into operating position. This brings the supplementary tooth level with the nine-tooth rack 53 of the second addition bar 43, and is retained by spring 52. The first number wheel continues to turn until it reaches digit zero (0), and the supplementary tooth 50 revolves the second number wheel to digit 1, the total now reading 10. A similar operation governs the remaining number wheels of the accumulator or counter 183.

As the second addition bar 43, bearing the auxiliary bar 49, is being returned to its normal position, the cam 51 comes into contact with the raised top portion of the auxiliary bar 49, thereby forcing the latter back to a position as shown in the lower part of Figure 10, the tip of said auxiliary bar being held by the lower step of spring 52.

With the exception of the manual setting of the date, the aforesaid description covers the automatic addition part of the device.

For identification of imprinted sheets, each device is provided with an additional type-carrier on which the serial number of the device is attached. This serial number is imprinted in the same manner as the page numbers, and, as an additional protection, the type of the page numbers as well as the serial number is milled, so as to produce an effect similar to that produced by checkwriters. The serial number on the addition part of the machine is preceded by a plus (+) sign, and the serial number on the subtraction part of the machine is preceded by a minus (—) sign.

Assuming that all of the sheets in a book of account have been numbered, as heretofore described, and the bookkeeper desires to discontinue, for example, sheet number three from said book of account. Inasmuch as the bookkeeper is responsible for all imprinted sheets, the page numbers of which have been summarized by the accumulator or counter 183, it is necessary to subtract the page number three from the total in the accumulator or counter 183, but this can be done only by the auditor, who has access to the upper, or the subtraction, part of the machine.

The auditor now unlocks the machine and shifts the accumulator shift lever 1, in slot 245 (Figure 31), from the plus (+) to the minus (—) position. By so doing, the rock shaft 18 is automatically locked by the fork 16, and the rock shaft 19 is automatically freed from fork 14. This disables the lower, or adding part, of the device.

At the same time the accumulator shift arms 12 are raised by arms 10, bringing the accumulator shaft 196 in one of the recesses of the four-stage cams 209. This also brings the accumulator number wheels 215 into alignment with the nine-tooth rack 108 of subtracting bar 103.

The auditor now sets the first selector lever 246 in notch three (3) of slot 247 of the indicator plate 127, and sets the date selector levers to the current date. The extent of the movement of the type-carriers 93 is now controlled by pin 125 on the face 124 of type-carrier segment and the stop ear 122 on the apron part 120 of selector levers 116. He now inserts sheet numbered three into upper slot 240 and turns the operating crank 36.

By turning the crank 36, the type-carriers come into selected printing position, and the platen 138 is brought into function in the same manner as previously described for the adding mechanism.

By an arrangement similar to the one described for the adding cam mechanism (lower part of Figure 24), the cam 209 is turned one-quarter revolution, thus lowering the accumulator shaft 196 a distance equivalent to the depth of the recess in said cam, and to accomplish this the accumulator shift arm 12 is permitted to expand an equal distance by means of the sliding connection in the upper part of said shift arm 12 (Figure 22). As a result, the pinions 220 on number wheels 215 are brought out of the engaging position with the nine-tooth rack 108 of subtracting bar 103 until after said subtracting bar 103 has been forced rearwardly a distance equal to the movement of the type-carrier 93, which corresponds in this case to three teeth, as set by the selector lever 116.

When the operating crank 36 is returned to its normal position, the type-carrier and the subtracting bar also returns to its normal position, thereby turning the number wheel 183 a distance equivalent to three digits on the number wheel, but in a direction opposite to that turned by the adding bar. The total in the accumulator or counter 183 now indicates 7, the sum of the page numbers of the three remaining sheets (1+2+4) in the book of account, and the discontinued sheet number three has been imprinted by the auditor on the upper right-hand corner with the page number three, the current date, and the serial number of the machine, the latter being preceded by a minus (—) sign.

Obviously, if no sheets have been discontinued from the book of account or no new sheets placed in the same, the total indicated on the counter 183 will remain the same.

If, however, one new account has been opened, the bookkeeper will place the new sheet in the machine (lower part), and the machine will stamp it as page 5, which would be added to the total on the counter 183, and the sheets would then total 12 (1+2+4+5).

New sheets can always be added to the book of account by the bookkeeper, and all new sheets, regardless of whether they are for new accounts or whether they take the place of sheets which have been discontinued or become filled, are stamped by the machine with new numbers, as no two sheets are to bear the same number. Since sheets not stamped would not be accepted by the auditor as authentic, it makes it necessary for the bookkeeper to stamp all sheets placed in the book of account, and, as the page numbers are summarized in the counter 183, the bookkeeper is charged with, and becomes responsible for, all sheets in his book of account.

From the foregoing description, taken in connection with the drawings, it will be seen that our invention provides a machine of the character set forth which is comparatively simple in construction, and designed to carry out the objects of the invention in a reliable and efficient manner. It will, of course, be understood that, while the construction disclosed is preferred, changes for and within the scope of the appended claims may be made without departing from the spirit or sacrificing any of the advantages of the invention.

What we claim is:

1. In a device of the class described, means for progressively impressing a continuous series of numbers on a series of sheets, totalizing means actuatable by said impressing means for indicating the sum of the numbers impressed, additional means for impressing a selected number on one of said aforesaid sheets withdrawn from said series of sheets, and means in cooperation with said additional means and said totalizing means for subtracting the absolute value of said selected number from the total indicated by said totalizing means.

2. In a device of the class described, means for progressively impressing a continuous series of positive integral numbers on a series of sheets, a first locking means for selectively permitting or preventing the operation of said last mentioned means, totalizing means for indicating the sum of numbers registered on said totalizing means, means controlled by said progressive impressing means and controlling said totalizing means for registering on said totalizing means the positive numbers impressed on said sheets in additive relation, means for impressing a selected negative number on a sheet withdrawn from said series of sheets, a second locking means for selectively permitting or preventing the operation of said negative numbering means, means controlled by said negative numbering means and controlling said totalizing means for subtracting the absolute value of said negative number from the total number indicated by said totalizing means, and interlocking means for placing one and only one of said locking means at a time in position for permitting operation of its respective numbering means.

3. In a device of the class described, means for progressively impressing a continuous series of numbers on successive sheets of a series of sheets, a totalizer, means to additively enter the value of said progressive series of impressed numbers in said totalizer, means to subtract the value of any selected number of said series from the total standing on said totalizer, means to operably position said subtracting means in accordance with the number selected, manually operable control means to shift said totalizer into adding or subtracting position, interlocking means operable by said last mentioned means to selectively prevent the operation of either said adding or subtracting means, and manual means to operate the unlocked adding or subtracting means.

4. In a device of the class described, means for progressively impressing a continuous series of numbers on successive sheets of a series of sheets, said means comprising a crank securely mounted on a common rotatable shaft, a progressive numbering mechanism comprising six elongated bars, a first one of said elongated bars being provided with a rack portion on one side thereof, a pinion engageable with said rack portion of said first bar, a series of type carriers, a mutilated gear, a ratchet gear fastened thereon, said mutilated gear being operable to mesh with said pinion which engages said rack portion of said first elongated bar, a pawl lever connected at one end to a connecting link, and a pawl pivotally connected to the other end of said pawl lever and in engagement with said ratchet gear, said first elongated bar comprising an elongated member having an enlarged front portion operable to come into engagement with a stop pin on the first of said series of type carriers, a horizontally disposed elongated slot adapted to receive guide rods, said elongated member having a horizontal short open slot disposed at the rear portion thereof, said horizontal short open slot being adapted to receive a shaft, split pinions rotatably supported by said shaft, an upright two-toothed rack meshing with one end of the first of said split pinions, said upright rack being securely attached to the rear end of said first elongated bar, an upright two-tooth rack on one side and an inverted rack on the opposite side of each of the next four of said elongated bars, and an inverted rack on one side of the rear end of the last of said elongated bars, a ratchet rack on the top edge of each of said elongated bars engageable with a three-armed pawl and a spring for returning each of said elongated bars to normal position; a totalizer, means to additively enter the value of said progressive series of impressed numbers in said totalizer, means to subtract the value of any selected number of said series from the total standing on said totalizer, means to operably position said subtracting means in accordance with the number selected, manually operable control means to shift said totalizer into adding or subtracting position, interlocking means operable by said last mentioned means to selectively prevent the operation of either said adding or subtracting means, and manual means to operate the unlocked adding or subtracting means.

5. In a device of the class described, means for progressively impressing a continuous series of numbers on successive sheets of a series of sheets, a plurality of rotatable type carriers arranged in coaxial parallel relation, a totalizer, means to additively enter the value of said progressive series of impressed numbers in said totalizer, said means comprising a common lower rotatable shaft, an operating handle therefor, said shaft supporting said type carriers for independent rotary movement, an addition bar for certain type carriers, a connecting link joining each addition bar to its corresponding type carrier, a rack wheel for each addition bar, a shift lever mechanism arranged to simultaneously engage each rack wheel with its corresponding addition bar; means to subtract the value of any selected number of said series from the total standing on said totalizer, means to operably position said subtracting means in accordance with the number selected, manually operable control means to shift said totalizer into adding or subtracting position, interlocking means operable by said last mentioned means to selectively prevent the operation of either said adding or subtracting means, and manual means to operate the unlocked adding or subtracting means.

6. In a device of the class described, means for progressively impressing a continuous series of numbers on successive sheets of a series of sheets, a totalizer, a plurality of rotatable type carriers arranged in coaxial parallel relation, means to additively enter the value of said progressive series of impressed numbers in said totalizer, means to subtract the value of any selected number of said series from the total standing on said totalizer, said last mentioned means comprising a common upper rotatable shaft, an operating handle therefor, said common upper rotatable shaft supporting said type carriers for independent rotary movement, subtraction bars for certain type carriers, a connecting link joining each subtraction bar to its corresponding type carrier, a rack wheel and a number wheel for each of said subtraction bars, means to operably position said subtracting means in accordance with the number selected, manually operable control means to shift said totalizer into adding or subtracting position, interlocking means operable by said last mentioned means to selectively prevent the operation of either said adding or subtracting means, and manual means to operate the unlocked adding or subtracting means.

7. In a device of the class described, means for progressively impressing a continuous series of numbers on successive sheets of a series of sheets, a totalizer, means to additively enter the value of said progressive series of impressed numbers in said totalizer, means to subtract the value of any selected number of said series from the total standing on said totalizer, selecting means to operably position said subtracting means for subtracting the selected number, said selecting means comprising a series of manually operated selectors rotatably mounted on a shaft, and means to hold said selectors in selected positions, manually operable control means to shift said totalizer into adding or subtracting position, interlocking means operable by said last mentioned means to selectively prevent the operation of either said adding or subtracting means, and manual means to operate the unlocked adding or subtracting means.

8. In a device of the class described, means for progressively impressing a continuous series of numbers on successive sheets of a series of sheets, a totalizer, means comprising addition bars to additively enter the value of said progressive series of impressed numbers in said totalizer, means comprising subtraction bars to subtract the value of any selected number of said series from the total standing on said totalizer, means to operably position said subtracting means in accordance with the number selected, said totalizer comprising a totalizer shaft, a series of number wheels rotatably mounted on said shaft, each of said number wheels comprising a rack wheel, each of said rack wheels being operable to engage a subtraction bar when subtracting or an addition bar when adding, manually operable control means to shift said totalizer into adding or subtracting position, interlocking means operable by said last mentioned means to selectively prevent the operation of either said adding or subtracting means, and manual means to operate the unlocked adding or subtracting means.

9. In a device of the class described, means for progressively impressing a continuous series of numbers on successive sheets of a series of sheets, a totalizer, means to additively enter the value of said progressive series of impressed numbers in said totalizer, means to subtract the value of any selected number of said series from the total standing on said totalizer, means to operably position said subtracting means in accordance with the number selected, manually operable control means to shift said totalizer into adding or subtracting position, said control means comprising a pair of yielding shift arms adapted to be uniformly raised or lowered, interlocking means operable by said last mentioned means to selectively prevent the operation of either said adding or subtracting means, and manual means to operate the unlocked adding or subtracting means.

10. In a device of the class described, means for progressively impressing a continuous series of successive numbers on successive sheets of a series of sheets, a totalizer, a plurality of rotatable type carriers in coaxial parallel relation, additive means to additively enter the value of said progressive series of impressed numbers in said totalizer, said additive means comprising a common lower rotatable shaft, an operating handle therefor, said shaft supporting said type carriers for independent rotary movement, an addition bar for certain type carriers, a connecting link joining each addition bar to its corresponding type carrier, a rack wheel for each addition bar, a shift lever mechanism arranged to simultaneously engage each rack wheel with its corresponding addition bar, subtracting means to subtract the value of any selected number of said series from the total standing on said totalizer, selecting means to operably position said subtracting means in accordance with the number selected, said subtracting means comprising a common upper rotatable shaft, an operating handle therefor, said common upper rotatable shaft supporting said type carriers for independent rotary movement, subtraction bars for certain type carriers, a connecting link joining each subtraction bar to its corresponding type carrier, a rack wheel and a corresponding cooperating number wheel for each of said subtraction bars, manually operable control means to shift said totalizer into adding or subtracting position, interlocking means operable by said last mentioned means to selectively prevent the operation of either said adding or subtracting means, said interlocking means comprising a pair of rockably supported fork levers each engageable selectively with said upper or lower rotatable shaft, and manual means to operate the unlocked adding or subtracting means.

RALPH F. MAJOR.
JOSEPH E. FARNER.